(12) United States Patent  
Gerhart et al.

(10) Patent No.: US 8,656,065 B1
(45) Date of Patent: Feb. 18, 2014

(54) METHOD AND APPARATUS FOR AUTOMATICALLY SELECTING A PLURALITY OF MODES FOR PROGRAMMABLE INTERFACE CIRCUIT BY COUPLING FIELD DEVICES TO PROCESS CONTROLLERS

(71) Applicant: Honeywell International Inc., Morristown, NJ (US)

(72) Inventors: Paul Gerhart, North Wales, PA (US); Christopher Ladas, Doylestown, PA (US); Angela Lordi, Lansdale, PA (US); Benjamin J. Stad, Cinnaminson, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/753,108

(22) Filed: Jan. 29, 2013

(51) Int. Cl.
*G06F 3/00* (2006.01)
*G06F 13/12* (2006.01)

(52) U.S. Cl.
USPC ........ 710/14; 710/8; 710/11; 710/15; 710/16; 710/62; 370/236; 370/252

(58) Field of Classification Search
USPC ......... 710/11, 8, 14, 15, 16, 62; 370/252, 236
See application file for complete search history.

(56) References Cited

U.S. PATENT DOCUMENTS

| | | | |
|---|---|---|---|
| 6,567,653 B1 * | 5/2003 | Sanders | 455/126 |
| 6,654,351 B1 * | 11/2003 | Casey | 370/252 |
| 6,981,090 B1 | 12/2005 | Kutz et al. | |
| 7,165,139 B2 * | 1/2007 | Bruner et al. | 711/112 |
| 8,135,884 B1 * | 3/2012 | Sullam et al. | 710/48 |
| 8,392,626 B2 * | 3/2013 | Wormmeester et al. | 710/11 |
| 2002/0126408 A1 * | 9/2002 | Okuyama et al. | 360/55 |
| 2004/0199674 A1 * | 10/2004 | Brinkhus | 710/1 |
| 2007/0223382 A1 * | 9/2007 | Crabtree et al. | 370/236 |
| 2009/0271558 A1 | 10/2009 | Wormmeester et al. | |

* cited by examiner

*Primary Examiner* — Tammara Peyton
(74) *Attorney, Agent, or Firm* — Jetter & Associates, P.A.

(57) ABSTRACT

A programmable interface circuit includes channel(s) including a digital logic block having terminals for receiving control signals from a process controller block, for providing logic signals, and terminals for receiving processed signal data. An analog logic block includes a current output digital to analog converter (DAC). An output circuit block includes first and second field terminals (S1,S2) and a sense resistor, wherein current from the DAC is coupled to S1 and the sense resistor is coupled to S2. The analog logic block includes a first and a second multi-channel multiplexer (MUX), an operational amplifier, and an analog to digital converter (ADC). The control signals automatically select from signal modes including an analog output (AO) mode, a digital output (DO) mode, an analog input (AI) mode, a digital input (DI) mode, and at least one additional signal mode provided by adding a sub-mode to the AI mode or DI mode.

18 Claims, 6 Drawing Sheets

Screws 1 and 2:
USE CASE 2
Screw P is S1 of neighbor I/O Channel:
USE CASE for AO or DO ON

METHOD AND APPARATUS FOR AUTOMATICALLY SELECTING A PLURALITY OF MODES FOR PROGRAMMABLE INTERFACE CIRCUIT BY COUPLING FIELD DEVICES TO PROCESS CONTROLLERS

FIELD

Disclosed embodiments relate to interface circuits for connecting process controllers in industrial or manufacturing plants to field devices.

BACKGROUND

In industrial (or manufacturing) settings, such as for petroleum refining, data, measurement values, control signals, and the like are generally transferred between control systems and one or field devices (e.g., sensors or actuators), requiring a large number of interface circuits. The connection or input/output (I/O) pins for conventional interface circuits communicating with the industrial environment are typically designated in general, based on the function for the I/O pins. Generally, the function of an I/O pin is determined by the physical properties of the signal, upstream or downstream higher system functions, and the system configuration. The field devices present interfaces that generally fall into one of four input/output (I/O) function categories, Analog Input (AI), Digital Input (DI), Analog Output (AO), or Digital Output (DO).

Limitations of existing interface circuit implementations are numerous. Such interface circuits have served only single or a very limited number of I/O functions, and have sometimes required three or more wire connection sites (screw terminals) to satisfy a broad range of functions. Moreover, such interface circuits have required the user to make decisions at the time of making wiring connections about the nature of the field device, have required wiring changes (in the circuit) if the user changes the nature of the device to be controlled have not supported voltage input types, have not supported differential input types, and have not been able to distinguish current shorts to ground from normal operation.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include programmable interface circuits and accompanying communication/signaling protocol software which enable the connecting of process controllers to field devices (sensors or actuators) deployed in industrial or manufacturing plant settings. The respective channel(s) of the interface circuit can be programmed by the user to be analog or digital, input/output, current or voltage, differential or grounded, without the need for pre-planning, based on the input/output (I/O) function type presented in a given plant application. Disclosed software configures each IO point/channel. Thus, disclosed programmable interface circuits remove the need for pre-planning of the wiring/devices and eliminate the penalty to the user (e.g., customer) for post installation changes in I/O point types/assignments/roles.

One embodiment comprises a programmable interface circuit which includes channel(s) including a digital logic block having terminals for receiving control signals from a process controller, terminals for providing logic signals; and terminals for receiving processed signal data. An analog logic block includes a current output digital to analog converter (DAC). An output circuit block includes first and second field terminals (S1,S2) and a sense resistor, wherein current from the DAC is coupled to S1 and the sense resistor is coupled to S2. The analog logic block includes a first and a second multi-channel multiplexer (MUX), an operational amplifier, and an analog to digital converter (ADC). The control signals automatically select from signal modes including an analog output (AO) mode, a digital output (DO) mode, an analog input (AI) mode, a digital input (DI) mode, and at least one additional signal mode provided by adding a sub-mode to the AI mode or DI mode. Controller/interface combinations are also disclosed including a process controller including a processor and memory storing a disclosed communications/signaling protocol algorithm, and a disclosed programmable interface circuit.

DETAILED DESCRIPTION

Figure 1:
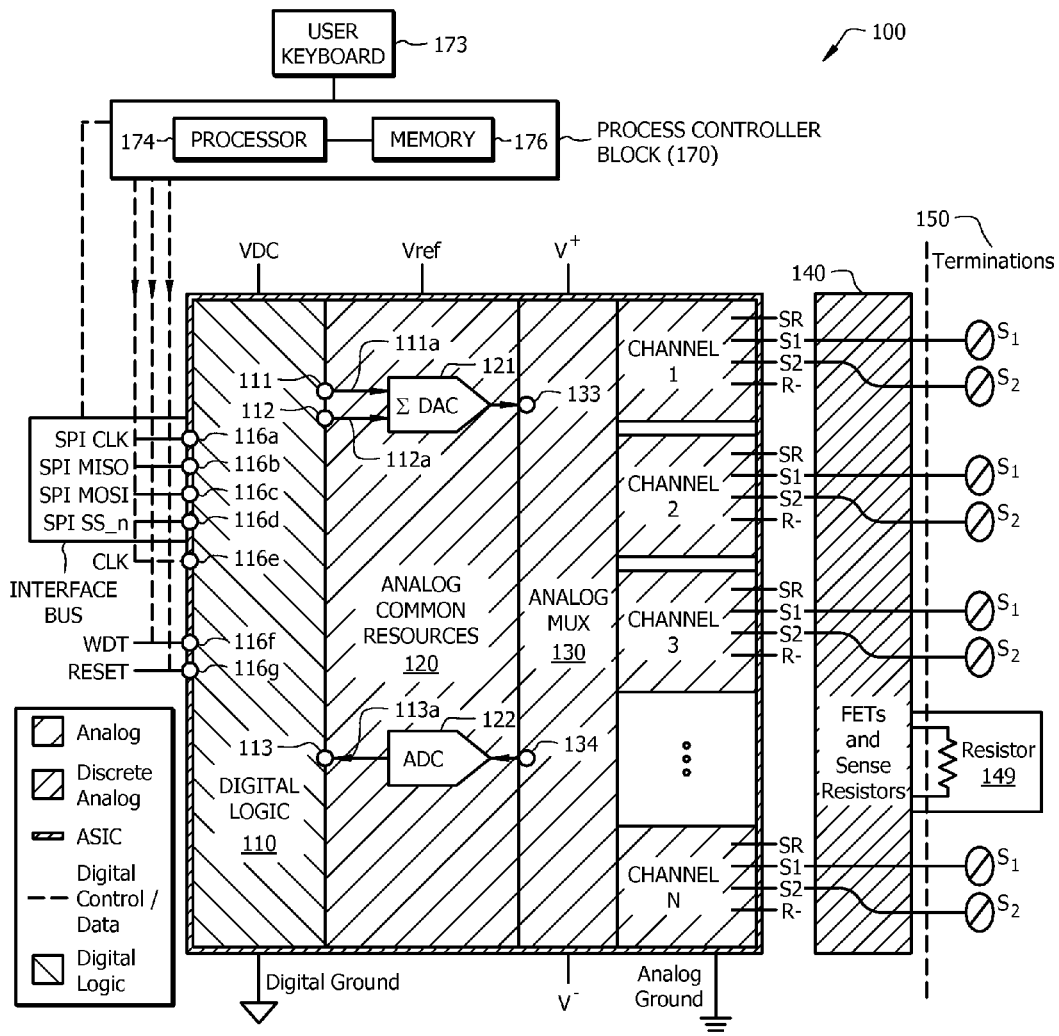
FIG. 1 is a block diagram of an example multi-channel programmable interface circuit, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 2:
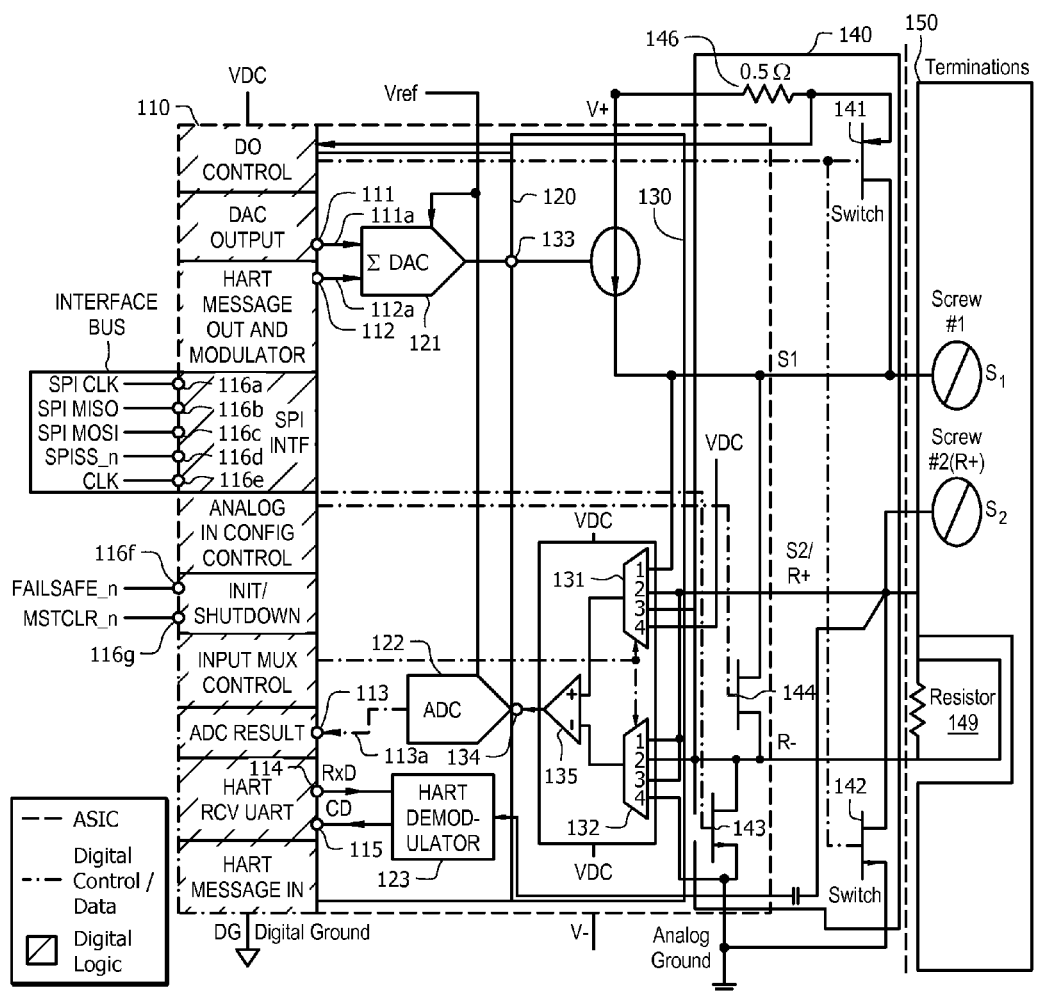
FIG. 2 is an example circuit implementation for one channel of the multi-channel programmable interface circuit shown in FIG. 1, according to an example embodiment.

FIG. 1 is a block diagram of an example multi-channel (N-channel) programmable interface circuit 100 for coupling a plurality of field devices to a process controller block 170, and FIG. 2 is an example circuit diagram for one of the N channels of the multi-channel programmable interface circuit 100, according to an example embodiment. The N I/O channels shown in FIG. 1 are shown as Channel 1, Channel 2, Channel 3, . . . Channel N. Although a multi-channel programmable interface circuit 100 is shown in FIG. 1, disclosed programmable interface circuits can have as few as a single channel, or as many as hundreds or thousands of channels. The signal mode for each channel is independently electronically configurable via control signals from a process controller block 170 for connection at its two (2) terminal screws shown as S1 and S2 to a field device (e.g., sensor or an actuator).

The N Channels can each be individually programmed by a user, such as using the user keyboard 173 shown, which results in process controller block 170 generating control signals which when coupled to the programmable interface circuit 100 result in the digital logic block 110 sending logic signals to nodes in the programmable interface circuit 100. The process controller block 170 includes host processor (or process controller) 174 (e.g., a digital signal processor or microcomputer) which has an associated memory 176 that stores the disclosed communication/signaling protocol which is implemented by processor 174.

The signal modes are all provided across terminals S1 and S2, and include an AO mode, a DO mode, an AI mode, a DI mode, and at least one additional signal mode provided by adding a sub-mode to the AI mode or DI mode. These sub-modes comprise a fifth mode configured when the field device is current signaling, a sixth mode configured when the field device is voltage signaling, and a seventh mode configured for differential grounding when the field device has its own internal ground reference.

The programmable interface circuit 100 includes a digital logic block 110 having a plurality of terminals including terminals 116a-g configured for receiving control signal communications from process controller block 170. Digital logic block 110 includes terminals 111 and 112 for providing a plurality of logic signals 111a and 112a to a current output DAC 121 provided by analog common resource block 120. Current output DAC 121 provides a variable current source. Analog common resource block 120 also includes an ADC 122. Either or both of the current output DAC 121 and ADC 122 of analog common resource block 120 may be optionally shared by the N channels.

Analog common resource block 120 is also shown in FIG. 2 further comprising a demodulator shown as a HART demodulator 123 which is shown configured to utilize Highway Addressable Remote Transducer (HART) Communication Protocol (HART Communication Foundation). Other communication protocols may be used by disclosed embodiments. Terminals 116a-d of digital logic block 110 are involved with the communications bus shown by example in FIGS. 1 and 2 as a Serial Peripheral Interface (SPI) bus. As known in the art, SPI is a synchronous serial data link standard, that operates in full duplex mode. However, other bus interfaces may be used with disclosed embodiments, including parallel interface buses.

The digital logic block 110 includes at least a first processed data terminal 113 for receiving processed signal data 113a from ADC 122. As shown in FIG. 2, HART demodulator 123 receives data (RxD) from terminal 114 of the digital logic block 110 and provides demodulated data (CD) to terminal 115 of the digital logic block 110.

The analog common resource block 120 is coupled to an analog MUX block 130. The MUX block 130 includes an input 133 for receiving current from the current output DAC 121 and an output 134 providing voltage signals to an input of the ADC 122. As shown in FIG. 2, the MUX block 130 includes MUX 131 and MUX 132 which have their outputs coupled to respective inputs of operation amplifier (op amp) 135. The output of op amp 135 is coupled to an input of ADC 122.

An output circuit block 140 including power transistors and sense resistors is coupled to a terminations block 150. Terminations block 150 includes first and second field terminals (S1 and S2) for each of the N channels for connecting field devices thereto. Output circuit block 140 comprises a sense resistor per channel shown as a resistor 149, and in FIG. 2 resistor 149 has a high potential side R+ and a low potential side R−. The variable current source provided by current output DAC 121 is coupled to S1 and R+ of resistor 149 is coupled to S2, and the low voltage side (R−) of the resistor 149 is coupled to input 2 of MUX 132. The resistor 149 can be a precision resistor which refers to a low temperature coefficient of resistance (TCR) resistor. Output circuit block 140 also includes sense resistor (SR) 146 shown for example as being 0.5 ohms which is in series with the DC power supply (V+) provided to MUX block 130 and output circuit block 140.

As shown in FIG. 2, the power transistors of output circuit block 140 are all shown as power metal oxide semiconductor field-effect transistors (MOSFETs) including FET 141 coupled between SR 146 and S1, FET 142 coupled between S2 and an analog ground, FET 143 coupled between R− and analog ground, and FET 144 coupled between S1 and R−. However, bipolar-based power transistors may also be used.

In operation of programmable interface circuit 100, FET 143 is in a state of either ON or OFF based on the logic signal from digital logic block 110 resulting from the control signal from process controller block 170, which determines whether the analog ground available will be used by programmable interface circuit 100. The ON or OFF state of FET 143 thus determines if the field device (source of input) is going to be connected to the analog ground FET 143 ON or not (FET 143 OFF). Even if FET 143 is OFF, the analog ground for programmable interface circuit 100 generally has some role in the function of the programmable interface circuit 100. All of the plurality of available signal modes provided by programmable interface circuit 100 utilize the current output DAC for signaling the field device and utilize the first and said second MUX, op amp, and ADC for signals received from the field device.

As used herein, "signaling type" indicates that the various field devices (sources of input) fall into two broad categories, being current and voltage. The programmable interface circuit 100 responds to voltage. If the field device is of a voltage type, resistor 149 is not needed. If the field device is of a current type, a voltage is developed by directing that current across resistor 149, such as a 100 to a 300 ohm resistor. The DAC 121 is always OFF when the field device has its own power.

Advantages of disclosed embodiments include a programmable interface circuit 100 and communication/signaling protocol for programmable process controllers which enable a single, common digital communication interface to control at least 10 distinct Input/Output (I/O) functions (described below) that are presented by field devices. Disclosed embodiments can address problems of controlling industrial or manufacturing processes, environments in buildings and homes, data gathering system, analog measurements, analog/digital outputs to control devices, etc. As described above, the programmable interface circuit is software configurable for the specific I/O function (device) via the communication protocol utilized.

The programmable interface circuit 100 uses only two wire connections (S1 and S2) to interface to a wide range of devices independent of the nature of the device. The programmable interface circuit 100 does not require decisions on the part of the user/installer at the time of making the wiring connection with respect to the type of device (e.g. Analog versus Digital, Input versus Output), signalling type (Current versus Voltage) and its grounding (permitting Differential or Grounded devices). Decisions about the I/O function type can be made after completing the wiring without disturbing or changing the wiring. In addition, disclosed programmable interface circuits enable (per configuration) diagnostics of the wiring in a new way that detects at least two classes of defects: Broken wire connections; wires that are shorted to ground (or other voltage rails) that divert current (power) away from the user's intended field device can be sensed. The disclosed programmable interface circuit and protocol support a high availability mode of operation via 1:1 redundancy.

The implementation can serve several approaches to high availability: For example, high availability can be provided by 1:1 redundancy, 1:N redundancy, voting etc.

The programmable interface circuit and protocol disclosed can support a variety of different functions. For example, HART 7 is supported for Analog Input and Analog Output type devices with a configurable mode of "auto discovery". The programmable interface circuit can associate a social time to the change of state of Digital Inputs (of various types) for Sequence of Events (SOE). The circuit can also count (accumulate) changes of state of the Digital Input (of various types). The Digital Outputs have Electronic Short Circuit Protection that eliminates the need for traditional fuses.

A safe-state can be entered upon initial Power-On Reset and/or when an external signal (Watch Dog Timer) indicates a lack of health of surrounding circuits or absence of the host process controller. The communication protocol disclosed is a secure, robust method to ensure that communication errors (due to noise or other disturbances) do not create incorrect measurements or outputs.

EXAMPLES

Disclosed embodiments are further illustrated by the following specific Examples, which should not be construed as limiting the scope or content of this Disclosure in any way.

Programmable interface circuit 100 can be realized in large part as a mixed-signal application specific integrated circuit (ASIC), with the ASIC providing digital logic block 110, analog common resource block 120, and MUX block 130. Output circuit block 140 can be realized using printed circuit board (PCB) technology by mounting discrete devices thereon. Each of the N I/O channels of the programmable interface circuit 100 is controlled and configured by a serial or parallel interface bus for its specific function (AI/DI/AO/DO) by a host processor, such as process controller block 170. From the point of view of the user of a disclosed programmable interface circuit 100, the supported I/O functions for each channel include, but are not limited to:

1. AI received from a field device that needs power from the programmable interface circuit (typically via a 0-20 mA current loop).
2. AI from a field device that provides its own current and is referenced to the programmable interface circuit (typically via a 0-20 mA current loop).
3. AI from a field device that provides its own current and may be referenced to a voltage/ground different than that of the programmable interface circuit (typically via a 0-20 mA current loop).
4. AI from a field device that presents a voltage (like a battery) and is referenced to the programmable interface circuit (typically 0-5VDC).
5. AI from a field device that presents a voltage (like a battery) and may be referenced to a voltage/ground different than that of the programmable interface circuit (typically 0-5VDC)
6. DI which needs power from the interface circuit (a dry contact).
7. DI which provides signals via its own power and may be referenced to a voltage/ground different than that of the programmable interface circuit (a voltage input similar to a battery).
8. AO (0-20 mA) (the programmable interface circuit supplies analog current to the field device).
9. DO (500 mA or higher) (the programmable interface circuit supplies digital current to the field device).
10. A safe-state that cannot damage or energize a field device that is mistakenly connected to the programmable interface circuit.

The "safe state" can be entered upon initial Power-On Reset and/or when an external signal (Watch Dog Timer) indicates a lack of health of surrounding circuits or absence of the process controller block 170. AI and AO functions can support HART 7 communication. As known in the art, HART data is transmitted by superimposing a low-level Frequency-shift keying (FSK) carrier onto an analog current or voltage signal, and is received using a modem and a simplified Universal Asynchronous Receiver/Transmitter (UART).

As used in these Examples, A though E refer to operating states for various devices in programmable interface circuit 100 which are controlled by logic signals from the digital logic block 110 that are themselves generated responsive to control signals received from the programmable process controller. A refers to MUX 131, and B to MUX 132. The values of C, D, E (FETs 143, 141 and 144, respectively) and the DAC 121 should remain at the values that are appropriate for the intended user' use-case for that I/O channel. The field device is shown as reference 348 throughout.

Function/Case 1: Analog Input from a field device 348 that needs power from the programmable interface circuit 100 (typically via a 0-20 mA current loop), see FIGS. 3A and 3B.

| Function | A | B | C | D | E | DAC |
|---|---|---|---|---|---|---|
| AI Normal 4-20 mA (LM and no LM) | 2 | 2 | ON | OFF | OFF | 25 mA |

In this case, the DAC 121 is set to its maximum output, effectively acting as a 24 Volt source (for a V+ level of 24V) with a 25-mA current limit. A field device 348 connected between screws S1 and S2 varies the current passing through it to indicate the value of the parameter the field device is measuring (e.g. temperature, pressure, level, etc.). Via S2, the modulated current passes through the resistor 149, such as the 250 ohm resistor shown, developing a voltage responsive to the modulated current which is measured by the ADC 122 via MUXs 131, 132 on path 2.

The user can configure LM as an option. When configured, the process controller block 170 will report the condition of a broken wire (broken line) to the control system if the ADC 122 conversion reflects the absence of current to/through the user's field device 348.

In most of these cases, LM refers to a way in which the programmable interface circuit 100 is used by the process controller block 170 as opposed to programmable interface circuit 100 design. Function/Case 8 described below is a possible exception. In this case, the analog loop is referenced to the same ground as the programmable interface circuit 100 (FET 143 is ON). HART is optionally supported.

Figure 3A:
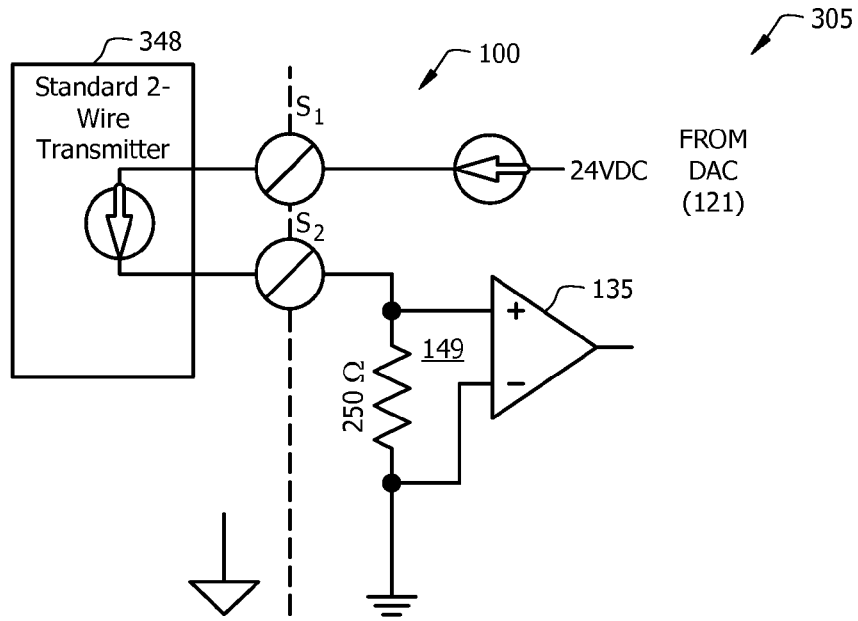
FIGS. 3A-G show various depictions for different example functions/cases for applying disclosed programmable interface circuits to connect to various field devices, according example embodiments.
Figure 3B:
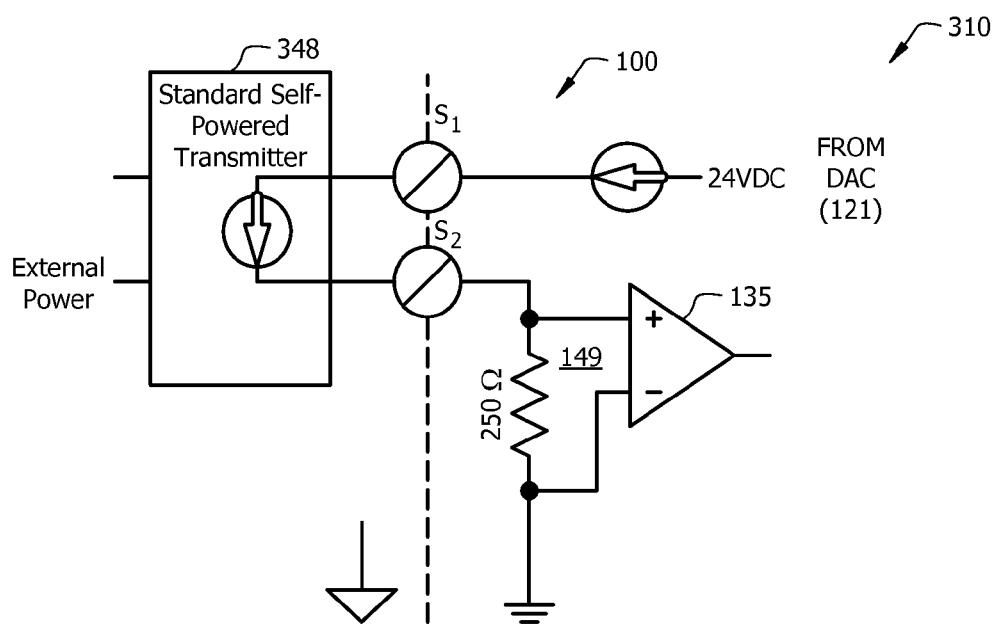

Function/Case 1 solves the scenarios from the perspective of a user demonstrated in the depiction 305 of FIG. 3A and depiction 310 of FIG. 3B.

Figure 3C:
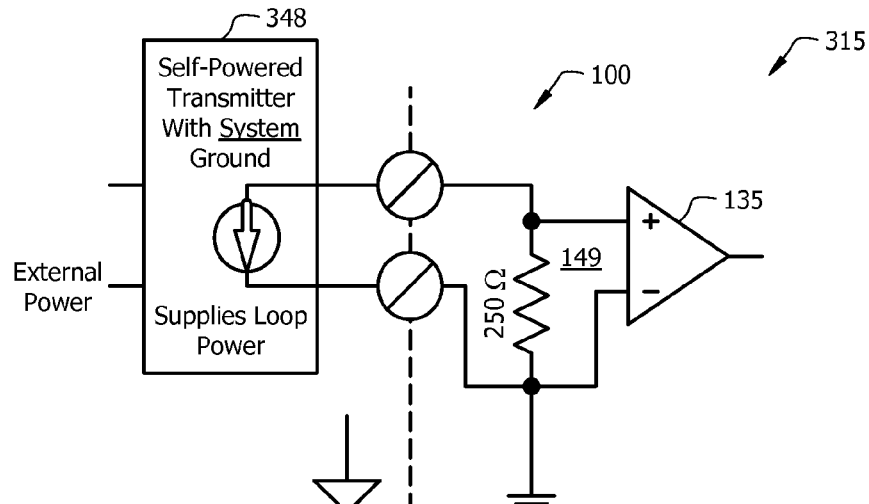
Figure 3D:
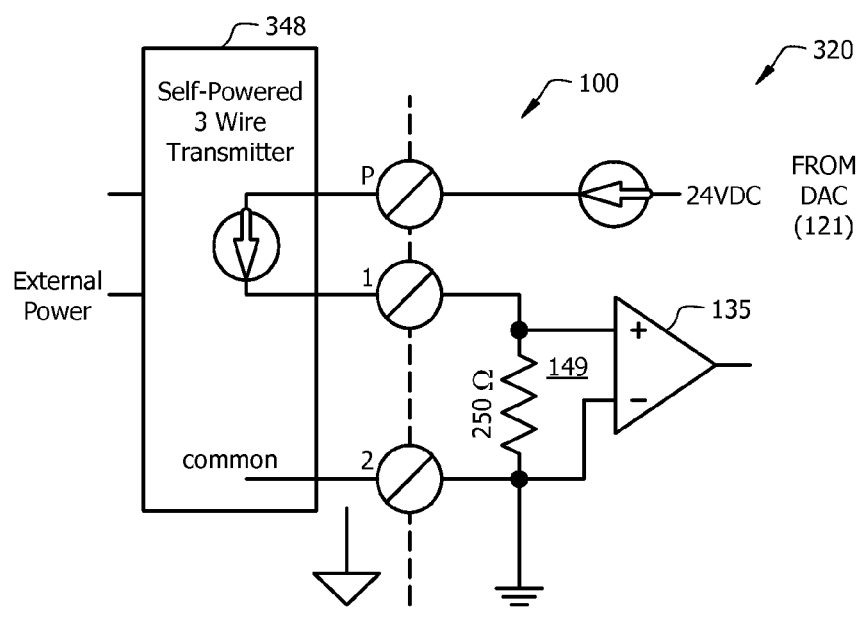

Function/Case 2: Analog Input from a field device 348 that provides its own current and is referenced to the programmable interface circuit 100 typically via a 0-20 mA current loop). See FIGS. 3C and 3D.

| Function | A | B | C | D | E | DAC |
|---|---|---|---|---|---|---|
| AI 4-20 mA (self powered) (LM and no LM) | 3 | 3 | ON | OFF | ON | 0 mA |

Figure 3E:
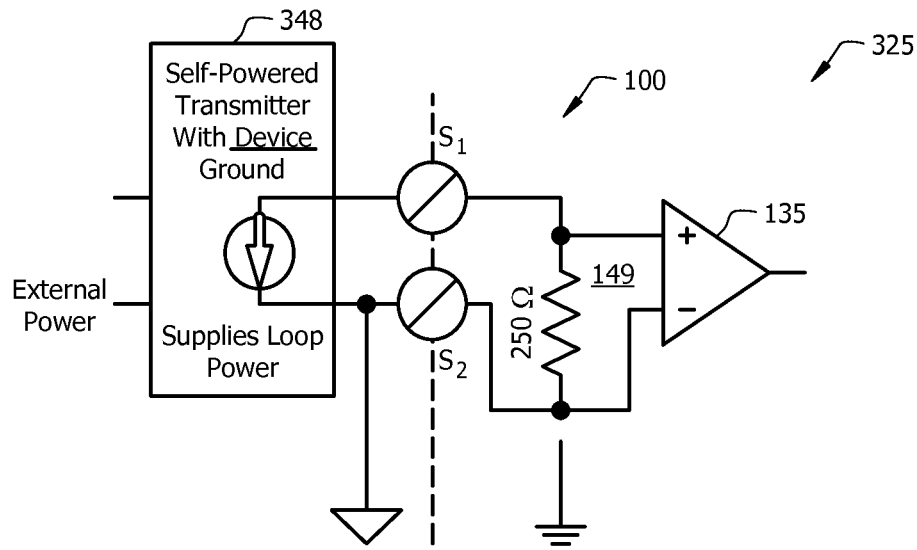

In this case the field device 348 produces a current between 0 and 20 mA. This current enters the programmable interface circuit 100 on pin S1 and is routed through FET 144 and then to the resistor 149. That current returns to the field device via S2. The MUXs 131 and 132 pass the voltage across the resistor 149 to the ADC 122 using multiplexor path 3 (which has the effect of correcting for the inverted voltage). The user can configure LM as an option. In this case, the analog circuitry of filed device is referenced to the same ground as the programmable interface circuit 100 (FET 143 is ON). HART is optionally supported. Case 2 solves the following scenarios from the perspective of user shown in the depiction 315 of FIG. 3C and depiction 320 of FIG. 3D:

Function/Case 3: Analog Input from a field device 348 that provides its own current and may be referenced to a voltage/ground different than that of the programmable interface circuit 100 (typically via a 0-20 mA current loop). See depiction 325 in FIG. 3E.

| Function | A | B | C | D | E | DAC |
|---|---|---|---|---|---|---|
| AI 4-20 mA (self powered) (LM and noLM) foreign ground | 3 | 3 | OFF | OFF | ON | 0 mA |

In this case the field device 348 produces a current between 0 and 20 mA. That current enters the programmable interface circuit 100 on pin S1. That current is routed through FET 144 then to the resistor 149 (e.g., 250 ohm resistor). That current returns to the field device 348 via S2. The MUXs 131, 132 pass the voltage across the resistor 149 to the ADC 122 using MUX path 3 (which has the effect of correcting for the inverted voltage). The user can configure LM as an option.

In this case, the user's field device 348 can be referenced to a ground different from that of the programmable interface circuit 100. A goal would be that either or both screws signals S1 and S2 can be 12V (maximum) to −7V (minimum) with respect to the analog ground of the programmable interface circuit 100. HART can be optionally supported. Case 3 solves the scenario shown in depiction 325 of FIG. 3E from the perspective of the user.

Figure 3F:
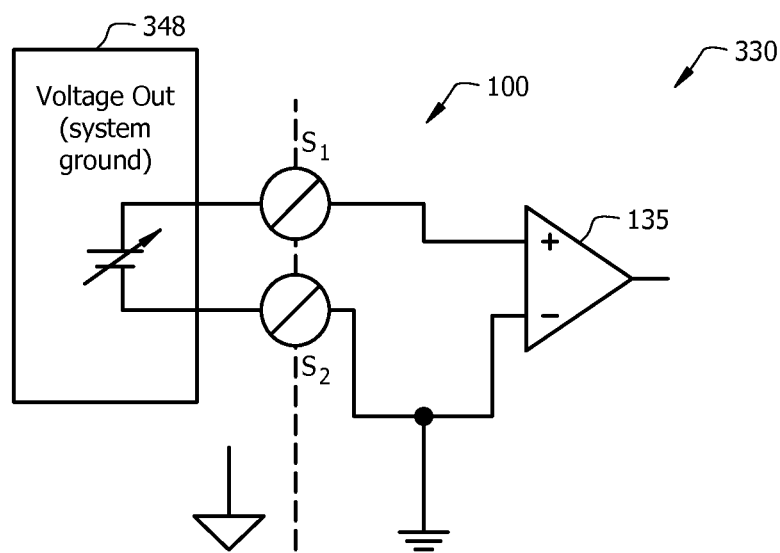

Function/Case 4: Analog Input from a field device 348 that presents a voltage (like a battery) and is referenced to the programmable interface circuit 100 (typically 0-5VDC). see depiction 330 in FIG. 3F.

| Function | A | B | C | D | E | DAC |
|---|---|---|---|---|---|---|
| AI Voltage In | 1 | 1 | ON | OFF | OFF | 0 mA* |

In this case the field device 348 produces a voltage between 0 and 10V. That voltage is presented to the programmable interface circuit 100 across pins S1 and S2. The MUXs 131, 132 pass the field device's voltage to the ADC 122 using MUX path 1.

Figure 3G:
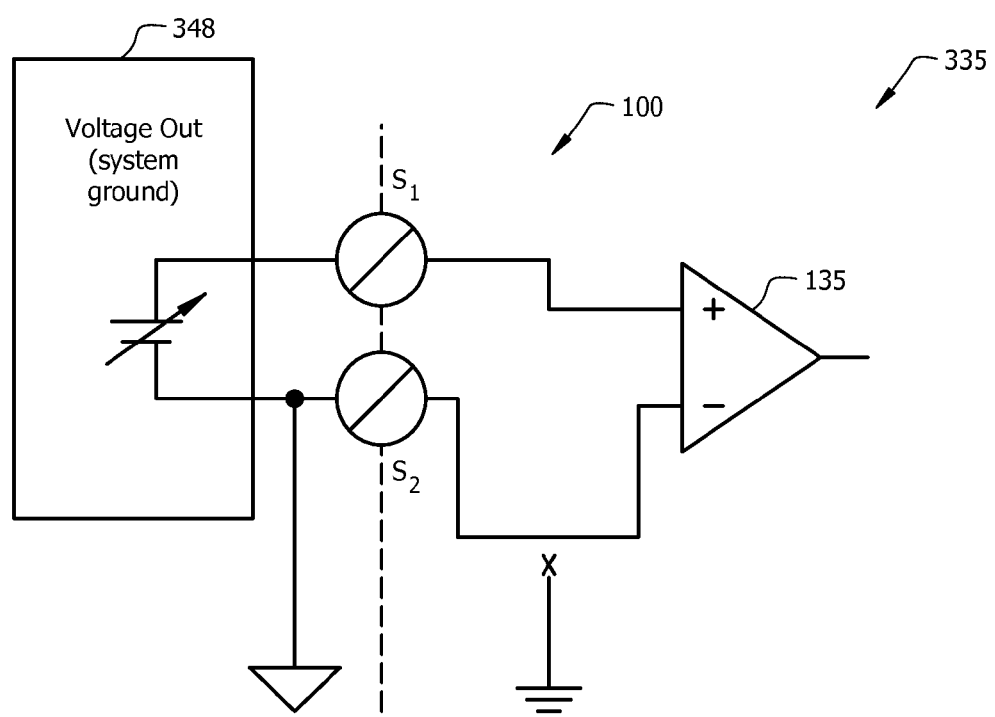

The user can configure LM as an option. LM makes sense if the user is using a field device which has a normal range of the input voltage which does not extend to 0V. For example, a field device with a 1 to 5V output would be suitable for LM. In this case, the analog value is referenced to the same analog ground as the programmable interface circuit 100 (FET 143 is ON). It is significant for this case for the DAC 121 to have no contribution to the measurement of the voltage. Case 4 solves the scenarios in depiction 330 of FIG. 3F from the perspective of the user:

Function/Case 5: Analog Input from a field device that presents a voltage (like a battery) and may be referenced to a voltage/ground different than that of the programmable interface circuit 100 (typically 0-5VDC). See FIG. 3G.

| Function | A | B | C | D | E | DAC |
|---|---|---|---|---|---|---|
| AI Voltage In | 1 | 1 | OFF | OFF | OFF | 0 mA* |

This case is almost identical to Function/Case 4 except, in this case, the user's field device can be referenced to a ground different from that of the programmable interface circuit 100. Thus, FET 143 is OFF. It is significant for this case the DAC 121 to have no contribution to the measurement of the voltage. Case 5 solves the scenarios shown in depiction 335 of FIG. 3G from the perspective of the user.

Function/Case 6: Digital Input which needs power from the programmable interface circuit 100 (dry contact).

| Function | A | B | C | D | E | DAC |
|---|---|---|---|---|---|---|
| DI (Normal) (LM and no LM) | 2 | 2 | ON | OFF | OFF | 7 mA |

This case is almost identical to Case 1. In this case the programmable interface circuit 100's DAC 121 produces 7 mA and that current exits the programmable interface circuit 100 at pin S1. The current is used to sense the closure of a relay contact (of the field device 348). The return current enters from screw S2 and passes through the resistor 149. The MUXs 131, 132 pass the voltage across the resistor 149 to the ADC 122 using MUX path 2.

The user can configure LM as an option. However, when using LM, the user should generally use discrete, external resistors to prevent a "false positive" when the relay contact of the field device 348 is open. In this case, the dry contact is referenced to the same ground as the resistor 149 (FET 143 is ON). The closure is detected as a normal ADC conversion and the process controller block 170 can have an algorithm to reduce the ADC 122 provided result to a single Boolean value. When the process controller block 170 determines that the relay of the filed device 348 has transitioned from OFF to ON it can command the DAC 121 to reduce the current to save power. When the process controller block 170 determines that the relay has transitioned from ON to OFF it can command the DAC 121 to 7 mA to provide sufficient "wetting current" for the relay contact.

Function/Case 7: Digital Input which provides signals via its own power and may be referenced to a voltage/ground different than that of the programmable interface circuit 100 (a voltage input similar to a battery)

| Function | A | B | C | D | E | DAC |
|---|---|---|---|---|---|---|
| DI Voltage In (LM not supported) foreign ground | 1 | 1 | OFF | OFF | OFF | 0 mA |

This case is identical to Case 3 with the exception that LM is not offered. As with Case 3, it is significant for this case for the DAC 121 to have no contribution to the measurement of the voltage.

Function/Case 8: Analog Output (0-20 mA).

| Function | A | B | C | D | E | DAC |
|---|---|---|---|---|---|---|
| AO (LM and no LM) | 2 | 2 | ON | OFF | OFF | 0-20 mA |

In this case the programmable interface circuit 100's DAC 121 produces 0-20 mA and that current exits the programmable interface circuit 100 at pin S1. The current is used to modulate an actuator (e.g. valve positioner). The return current enters from S2 and passes through the resistor 149. The MUXs 131, 132 pass the voltage across the resistor 149 to the ADC 122 using MUX path 2.

The user can configure line monitoring (LM) as an option, sometimes referred to as "broken wire detection" or "open wire detection". LM makes sense if the user is using a field device 348 which has a normal range of current that has a minimum value greater than 0 mA. For example, a field device 348 with a normal current actuation range of 4-20 mA would be suitable for LM. It is noted that in this case, the use of LM can relate to the design of the programmable interface circuit 100. Specifically, the programmable interface circuit 100 is able to maintain the Analog Output value while performing an ADC conversion. It can save cost to implement the ADC 122 as using a Successive Approximation Register approach with the DAC 121 feeding the comparison point. This is acceptable but the Analog Output current to the user's field device 348 should be maintained without interruption. In this case, the analog loop is referenced to the same ground as the programmable interface circuit 100 (FET 143 is ON). HART is optionally supported. The commands to the programmable interface circuit 100 can command the FETs to be ON (to energize) or to be OFF (to de-energize). i.e. the host commands both ON and OFF depending on the state of the control strategy, plant, work shift etc.

Function/Case 9: Digital Output.

| Function | A | B | C | D | E | DAC |
|---|---|---|---|---|---|---|
| DO ON (no LM) | d.c. | d.c. | OFF | ON | OFF | 0 mA |

| Function | A | B | C | D | E | DAC |
|---|---|---|---|---|---|---|
| DO OFF (LM) | 2 | 2 | ON | OFF | OFF | 0 mA, 1 mA |

| Function | A | B | C | D | E | DAC |
|---|---|---|---|---|---|---|
| DO OFF (no LM) | d.c. | d.c. | OFF | OFF | OFF | 0 mA |

In this case the Programmable interface circuit 100 Digital Logic 110 turns ON the switches 141 and 142 shown as FETs to energize and field load (e.g. relay).

The user can configure LM as an option. The case for the DO OFF works by passing a small current (1 mA) through the load for a short time (sufficient for one ADC conversion). The MUX 131, 132 pass the voltage across the resistor 149 to the ADC 122 using MUX path 2. In this case, the user's field device is referenced to the same ground as the programmable interface circuit 100, but the field device (load) current only enters the programmable interface circuit 100 when the DO is OFF and LM is configured (FET 143 is ON).

Function/Case 10: A safe-state that cannot damage or energize a field device 348 that is mistakenly connected.

| Function | A | B | C | D | E | DAC |
|---|---|---|---|---|---|---|
| Safe State | 2 | 2 | ON | OFF | OFF | 1 mA |

In this case, the I/O channel is not is use and no field device is expected to be connected. The programmable interface circuit 100 is configured similar to Case 1, but with only 1 mA from the DAC 121. This supports a diagnostic mode that can detect the unintended presence of a field device 348.

Diagnostic Function/Case 1: 3V3 (Digital Vcc)

| Function | A | B | C | D | E | DAC |
|---|---|---|---|---|---|---|
| Safe State | 4 | 4 | * | * | * | * |

In this case, the ADC 122 measures 3V3. This is for programmable interface circuit 100 health/safety, and does not relate to a user use-case. The MUX 131, 132 pass the voltage to the ADC 122 using MUX path 4.

These are but a few examples. Accordingly, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The invention claimed is:

1. A programmable interface circuit including at least one channel for coupling a field device to a process controller block, said channel comprising:
   a digital logic block having a plurality of terminals including terminals configured for receiving control signals from said process controller block, terminals for providing a plurality of logic signals; and at least a first processed data terminal for receiving processed signal data;
   an analog logic block coupled to receive a first portion of said logic signals including a current output digital to analog converter (DAC) which provides a variable current source, and
   an output circuit block that includes first and second field terminals (S1 and S2) for connecting said field device across, and a sense resistor, wherein said variable current source is coupled to said S1 and said sense resistor is coupled to said S2;
   wherein said analog logic block further comprises a first and a second multi-channel multiplexer (MUX) coupled to receive a second portion of said logic signals, an operational amplifier (op amp), and analog to digital converter (ADC), wherein said first and said second MUX are across said sense resistor and have their respective outputs coupled to respective inputs of said op amp, and wherein an output of said op amp is coupled to an input of said ADC, and an output of said ADC is coupled to provide said processed signal data to said processed data terminal of said digital logic block,
   wherein said control signals automatically select from a plurality of available signal modes for said programmable interface circuit including an analog output (AO) mode, a digital output (DO) mode, an analog input (AI) mode, a digital input (DI) mode, and at least one additional signal mode provided by adding a sub-mode to said AI mode or said DI mode.

2. The programmable interface circuit of claim 1, wherein said additional signal mode is at least one selected from a fifth mode configured when said field device is current signaling, a sixth mode configured when said field device is voltage signaling, and a seventh mode configured for differential grounding when said field device has an internal ground reference.

3. The programmable interface circuit of claim 1, wherein said programmable interface circuit includes a plurality of said channels.

4. The programmable interface circuit of claim 1, wherein said output circuit block includes a transistor that is operable upon receipt of one of said logic signals to select or deselect an analog ground connection provided by said programmable interface circuit.

5. The programmable interface circuit of claim 1, wherein said current output DAC is turned OFF when said field device has its own power.

6. The programmable interface circuit of claim 1, wherein all of said plurality of available signal modes are provided by connecting said field device across terminals consisting of said S1 and said S2.

7. The programmable interface circuit of claim 1, wherein all of said plurality of available signal modes utilize said current output DAC for signaling said field device and utilize said first and said second MUX, said op amp, and said ADC for signals received from said field device.

8. The programmable interface circuit of claim 1, wherein said additional signal mode includes from a fifth mode configured when said field device is current signaling, a sixth mode configured when said field device is voltage signaling, and a seventh mode configured for differential grounding when said field device has an internal ground reference.

9. A programmable interface circuit including at least one channel for coupling a field device to a process controller block, said channel comprising:
   a digital logic block having a plurality of terminals including terminals configured for receiving control signals from said process controller block, terminals for providing a plurality of logic signals; and at least a first processed data terminal for receiving processed signal data;
   an analog logic block coupled to receive a first portion of said logic signals including a current output digital to analog converter (DAC) which provides a variable current source, and
   an output circuit block that includes first and second field terminals (S1 and S2) for connecting said field device across, and a sense resistor, wherein said variable current source is coupled to said S1 and said sense resistor is coupled to said S2;
   wherein said analog logic block further comprises a first and a second multi-channel multiplexer (MUX) coupled to receive a second portion of said logic signals, an operational amplifier (op amp), and analog to digital converter (ADC), wherein said first and said second MUX are across said sense resistor and have their respective outputs coupled to respective inputs of said op amp, and wherein an output of said op amp is coupled to an input of said ADC, and an output of said ADC is coupled to provide said processed signal data to said processed data terminal of said digital logic block,
   wherein said control signals automatically select from a plurality of available signal modes for said programmable interface circuit including an analog output (AO) mode, a digital output (DO) mode, an analog input (AI) mode, a digital input (DI) mode, and
   additional signal modes provided by adding a sub-mode to said AI mode or said DI mode including a fifth mode configured when said field device is current signaling, a sixth mode configured when said field device is voltage signaling, and a seventh mode configured for differential grounding when said field device has an internal ground reference.

10. A process controller/interface combination, comprising:
    a process controller block including a processor and memory storing a communications/signaling protocol algorithm, said process controller block providing control signals, and
    a programmable interface circuit including at least one channel for coupling a field device to said process controller block, said channel comprising:
    a digital logic block having a plurality of terminals including terminals configured for receiving said control signals from said process controller block, terminals for providing a plurality of logic signals; and at least a first processed data terminal for receiving processed signal data;
    an analog logic block coupled to receive a first portion of said logic signals including a current output digital to analog converter (DAC) which provides a variable current source, and an output circuit block that includes first and second field terminals (S1 and S2) for connecting said field device across, and a sense resistor, wherein said variable current source is coupled to said S1 and said sense resistor is coupled to said S2;

wherein said analog logic block further comprises a first and a second multi-channel multiplexer (MUX) coupled to receive a second portion of said logic signals, an operational amplifier (op amp), and analog to digital converter (ADC), wherein said first and said second MUX are across said sense resistor and have their respective outputs coupled to respective inputs of said op amp, and wherein an output of said op amp is coupled to an input of said ADC, and an output of said ADC is coupled to provide said processed signal data to said processed data terminal of said digital logic block, wherein said control signals automatically select from a plurality of available signal modes for said programmable interface circuit including an analog output (AO) mode, a digital output (DO) mode, an analog input (AI) mode, a digital input (DI) mode, and at least one additional signal mode provided by adding a sub-mode to said AI mode or said DI mode.

11. The process controller/interface combination of claim 10, wherein said additional signal mode is at least one selected from a fifth mode configured when said field device is current signaling, a sixth mode configured when said field device is voltage signaling, and a seventh mode configured for differential grounding when said field device has an internal ground reference.

12. The process controller/interface combination of claim 10, wherein said programmable interface circuit includes a plurality of said channels.

13. The process controller/interface combination of claim 10, wherein said output circuit block includes a transistor that is operable upon receipt of one of said logic signals to select or deselect an analog ground connection provided by said programmable interface circuit.

14. The process controller/interface combination of claim 10, wherein said current output DAC is turned off when said field device has its own power.

15. The process controller/interface combination of claim 10, wherein all of said plurality of available signal modes are provided by connecting said field device across terminals consisting of said S1 and said S2.

16. The process controller/interface combination of claim 10, wherein all of said plurality of available signal modes utilize said current output DAC for signaling said field device and utilize said first and said second MUX, said op amp, and said ADC for signals received from said field device.

17. The process controller/interface combination of claim 10, wherein said additional signal mode includes from a fifth mode configured when said field device is current signaling, a sixth mode configured when said field device is voltage signaling, and a seventh mode configured for differential grounding when said field device has an internal ground reference.

18. The process controller/interface combination of claim 10, wherein communications between said process controller block and said programmable interface circuit utilize a Serial Peripheral Interface (SPI) data bus.

* * * * *